(12) United States Patent
Madigan

(10) Patent No.: US 8,011,671 B2
(45) Date of Patent: *Sep. 6, 2011

(54) SHAFT SEAL HAVING INTEGRATED REMOVAL FEATURE

(75) Inventor: Christopher Madigan, Brighton, MI (US)

(73) Assignee: Federal-Mogul World Wide, Inc., Southfield, MI (US)

(*) Notice: Subject to any disclaimer, the term of this patent is extended or adjusted under 35 U.S.C. 154(b) by 750 days.

This patent is subject to a terminal disclaimer.

(21) Appl. No.: 12/019,752

(22) Filed: Jan. 25, 2008

(65) Prior Publication Data

US 2009/0189357 A1    Jul. 30, 2009

Related U.S. Application Data

(63) Continuation of application No. 11/412,471, filed on Apr. 27, 2006, now Pat. No. 7,347,424.

(51) Int. Cl.
*F16J 15/32* (2006.01)
(52) U.S. Cl. ...... 277/551; 277/576; 277/577; 29/402.02
(58) Field of Classification Search .................. 277/576, 277/577, 551; 29/402.02
See application file for complete search history.

(56) References Cited

U.S. PATENT DOCUMENTS

| | | | |
|---|---|---|---|
| 2,209,750 A | 7/1940 | Victor | |
| 2,233,147 A | 2/1941 | Victor | |
| 2,264,970 A * | 12/1941 | Giles | 277/577 |
| 2,291,570 A | 7/1942 | Clark | |
| 2,293,479 A | 8/1942 | Thorndike | |
| 2,334,349 A | 11/1943 | Mika | |
| 2,471,557 A * | 5/1949 | Bishop | 81/8.1 |
| 2,483,988 A * | 10/1949 | Victor | 277/577 |
| 2,587,405 A | 2/1952 | Stevens et al. | |
| 3,005,648 A | 10/1961 | Christensen | |
| 3,214,180 A | 10/1965 | Hudson | |
| 3,423,141 A | 1/1969 | Pethis | |
| 3,492,010 A * | 1/1970 | Paxton | 277/558 |
| 3,494,682 A | 2/1970 | Keller | |
| 3,801,114 A * | 4/1974 | Bentley | 277/559 |
| 4,433,846 A | 2/1984 | Romero et al. | |
| 4,525,082 A | 6/1985 | Brandenstein et al. | |
| 4,583,749 A | 4/1986 | Hatch | |
| 4,623,153 A | 11/1986 | Nagasawa | |
| 4,664,392 A | 5/1987 | Hatch | |
| 4,696,479 A * | 9/1987 | Karcher | 277/353 |
| 4,822,059 A | 4/1989 | Shimasaki et al. | |
| 4,844,485 A | 7/1989 | Antonini et al. | |
| 4,898,394 A | 2/1990 | Voitik | |
| 6,152,454 A | 11/2000 | Marnot | |
| 6,170,833 B1 * | 1/2001 | Cox et al. | 277/551 |
| 6,357,757 B1 * | 3/2002 | Hibbler et al. | 277/551 |
| 7,059,608 B2 * | 6/2006 | Ramsay | 277/551 |
| 7,347,424 B2 * | 3/2008 | Madigan | 277/551 |
| 7,722,052 B2 * | 5/2010 | Oida et al. | 277/564 |
| 2002/0089124 A1 * | 7/2002 | Hosokawa et al. | 277/551 |
| 2006/0249915 A1 * | 11/2006 | Madigan | 277/551 |

* cited by examiner

*Primary Examiner* — Alison K Pickard
(74) *Attorney, Agent, or Firm* — Robert L. Stearns; Dickinson Wright PLLC

(57) ABSTRACT

A dynamic shaft seal assembly has inner and outer cases that are clamped together to secure a seal element therebetween for dynamic sealing about a rotatable shaft. The inner case is formed with integral pull tabs that are engageable by a seal removal tool to facilitate the removal of the seal assembly from a bore in which the seal assembly is installed.

15 Claims, 3 Drawing Sheets

SHAFT SEAL HAVING INTEGRATED REMOVAL FEATURE

CROSS-REFERENCE TO RELATED APPLICATIONS

This application is a continuation of U.S. application Ser. No. 11/412,471, filed Apr. 27, 2006 now U.S. Pat. No. 7,347,424 granted Mar. 25, 2008, which is incorporated herein by reference.

BACKGROUND OF THE INVENTION

1. Technical Field

This invention relates generally to shaft seals, and more particularly to those having features that enable the seal to be removed from a bore after installation.

2. Related Art

Automotive air conditioning compressor seals that require removal for service rely on three know methods for providing a surface that can be engaged by a tool so that the seal can be removed once it is installed in a bore. One approach is to provide a recessed step in the outer casing of the seal. Such a recessed step is difficult to manufacture consistently and the removal tool must be capable of exerting sufficient inward radial force in order to grip the recessed step with sufficient strength to enable the seal to be pulled from the bore. Another approach is to add a separate pull ring component to the seal assembly. An example of this type is shown in U.S. Pat. No. 4,623,153. This involves stamping the separate ring piece with slots and tabs and then clamping this piece between the inner and outer seal cases. This approach adds cost and complexity to the manufacture of seals. The third known approach utilizes the end flange of the outer case that is curled over the end of the inner case to secure the cases together and to clamp the seal element between the cases. The curled end flange is extended beyond the inner case to present a tool-engaging edge. However, the curl over is often thinner than the rest of the outer casing and is prone to tearing out under the extraction force of the tool or doesn't have sufficient length to allow easy removal.

SUMMARY OF THE INVENTION

A dynamic seal assembly constructed according to a presently preferred embodiment of the invention includes inner and outer annular cases between which a seal element is clamped. The inner seal element is formed with integral pull tabs for engagement by a seal removal tool. According to particular preferred feature, the pull tabs project from an inner mouth of the inner case.

The invention also provides a method of removing a dynamic shaft seal assembly from a bore comprising the steps of engaging pull tabs formed as one piece with an inner case of the seal assembly with a seal removal tool from an air side of the seal assembly; and applying an axial pulling force on the pull tabs to withdraw the seal assembly.

The invention has the advantage of providing a simple, low cost, robust solution to the removal of shaft seal assemblies. Incorporating the pull tabs into the inner casing minimizes parts and overcomes the shortcomings of the prior known solutions.

BRIEF DESCRIPTION OF THE DRAWINGS

These and other features and advantages of the present invention will become more readily appreciated when considered in connection with the following detailed description and appended drawings, wherein.

DETAILED DESCRIPTION

Figure 1:
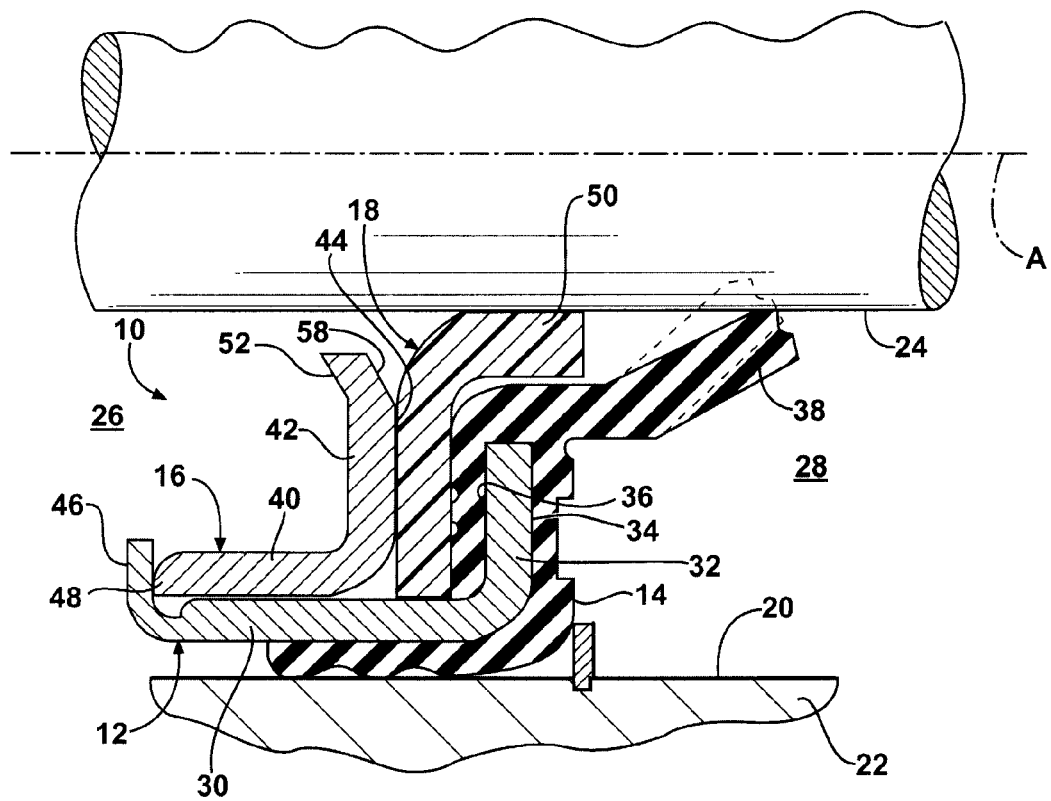
FIG. 1 is a cross-sectional view of an embodiment of a shaft seal assembly shown installed in a bore.

A dynamic shaft seal assembly constructed according to an embodiment of the invention is shown generally at 10 in FIG. 1 and includes an outer annular rigid support housing or metal case 12 having bonded thereto an elastomeric seal body 14, an inner annular rigid support housing or metal case 16, and a dynamic seal element 18 clamped between the inner and outer cases. As shown in FIG. 1, the case 16 is nested in the case 12. The seal assembly 10 is installable in a bore 20 of housing 22 to dynamically seal a rotatable shaft 24 extending through the bore 20. The seal assembly 10 has an air side 26 and an oil side 28 in relation to its orientation when installed in the bore 20. The seal assembly 10 operates to contain lubricant within the housing on the oil side 28 of the seal assembly 10 and to exclude contaminants from entering the housing 22 from the air side 26 of the seal assembly 10.

The outer case 12 includes an axially extending cylindrical mounting portion 30. An annular flange portion 32 projects radially inwardly from the mounting portion 30 at the oil side 28 of the seal assembly. The flange portion 32 has an axially inwardly facing surface 34 and an axially outwardly facing surface 36. The seal body 14 is molded about the flange portion 32 and extends over the opposite surfaces 34, 36 as well as extending onto the outer surface of the mounting portion 30 to provide a fluid tight seal between the outer case 12 and the wall of the bore 20. The seal body 14 includes an annular seal lip 38 extending radially inwardly from the flange portion 32 for encircling and sealingly engaging the shaft 24 in operation.

The inner case 16 has a generally L-shaped cross section and includes an axially extending outer leg or cylindrical portion 40 located radially inwardly of the mounting portion 30 of the outer case 12. An annular inner leg or flange portion 42 extends radially inwardly of the cylindrical portion 40 adjacent the annular flange portion 32 of the outer case 12. The flange portion 42 has an inwardly facing clamping surface 44 that is spaced axially from the face 34 of the outer case 12. A radially outer end of the seal element 18 extends between the clamping surface 44 and the seal body material 14 molded to the surface 34 of the outer case 12. An axially outer end 46 of the outer case 12 is forceably curled over an axially outer end 48 of the inner case 16 and operates to urge the outer and inner cases 12,16 axially toward one another thus generating a compressive load on the seal element 18 to thereby securely clamp the seal element 18 between the flange portions 32, 42 of the outer and inner cases 12, 16 and to keep the cases 12,16 from separating axially from one another or unlocking.

The seal element 18 is preferably fabricated of PTFE material and is in the preferred form of a disc-like wafer that is clamped at its outer diameter and extends radially inwardly to define a lay-down sealing collar or lip 50 the lays down against and encircles the shaft 24. The seal assembly up to this point is of conventional construction and the invention contemplates within its scope variations on the general seal design having inner and outer cases without departing from the intended scope.

Figure 2:
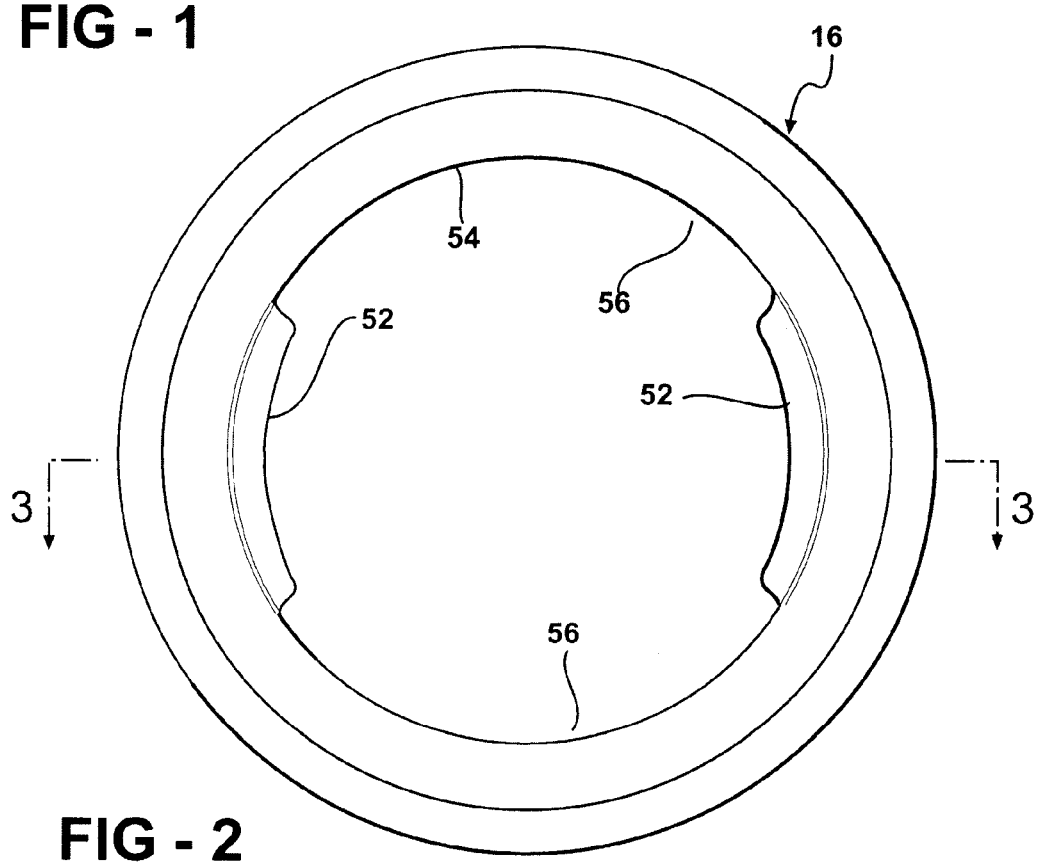
FIG. 2 is an end view of the inner casing of the seal of FIG. 1.
Figure 3:
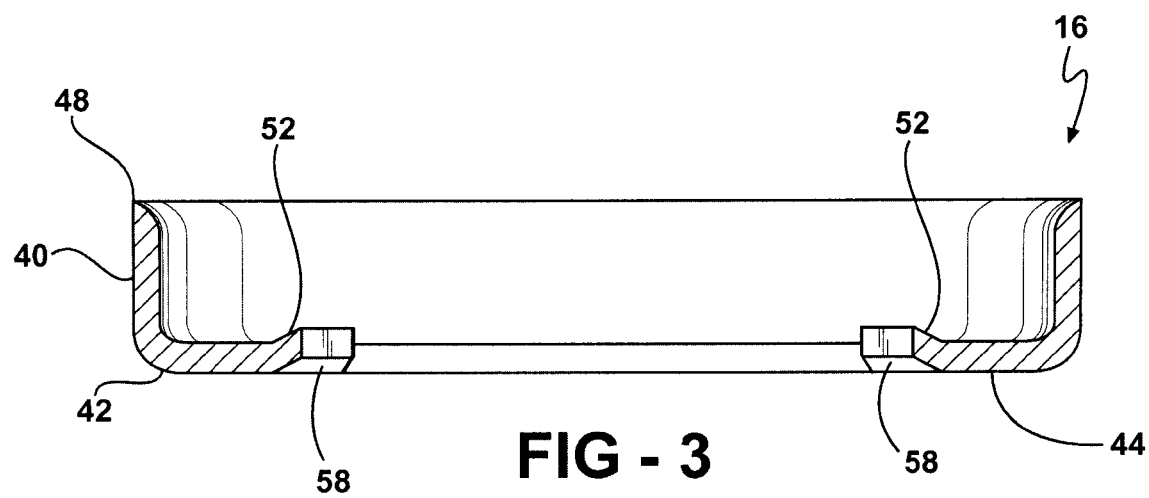
FIG. 3 is a cross-sectional view taken generally along lines 3-3 of FIG. 2.

Referring now additionally to FIGS. 2 and 3, it will be seen that the inner case 16 has at least one and may have a plurality of pull tabs 52 formed of one piece with the inner case 16 of the same material. The pull tabs 52 may be in opposing relationship to one another if there are two such tabs 52 as illustrated. The inner case 16, as well as the pull tab features 52, is preferably formed as a stamping from steel material. The inner boundary of the flange portion 42 defines a mouth edge 54. The pull tabs 52 preferably extend from the mouth edge 54 both radially inwardly and axially outwardly at an acute angle of about 30 degrees. The pull tabs 52 define lobes or ears that are spaced circumferentially from one another. The regions between the pull tabs 52 defines radially enlarged openings or recesses 56. Those skilled in the art will appreciate that the same or equivalent structure of the tabs and recesses can be derived by calling the inner edge of the pull tab regions the mouth edge and cutting away material to form the recesses, and that either way one ends up with a plurality of tabs and intervening spaces.

It will be seen from FIG. 1 that the pull tabs 52 extend axially away from the seal element 18 such that a backside of the pull tabs 52 are spaced from the seal element 18 and define inner pull surfaces 58. The pull tabs 52 are exposed to and accessible from the air side 26 of the seal assembly 10 when the assembly 10 is installed in the bore 20. The space between the seal element 18 and the pull surfaces 58 is unoccupied; thus a removing tool can be moved into the space.

Figure 4:
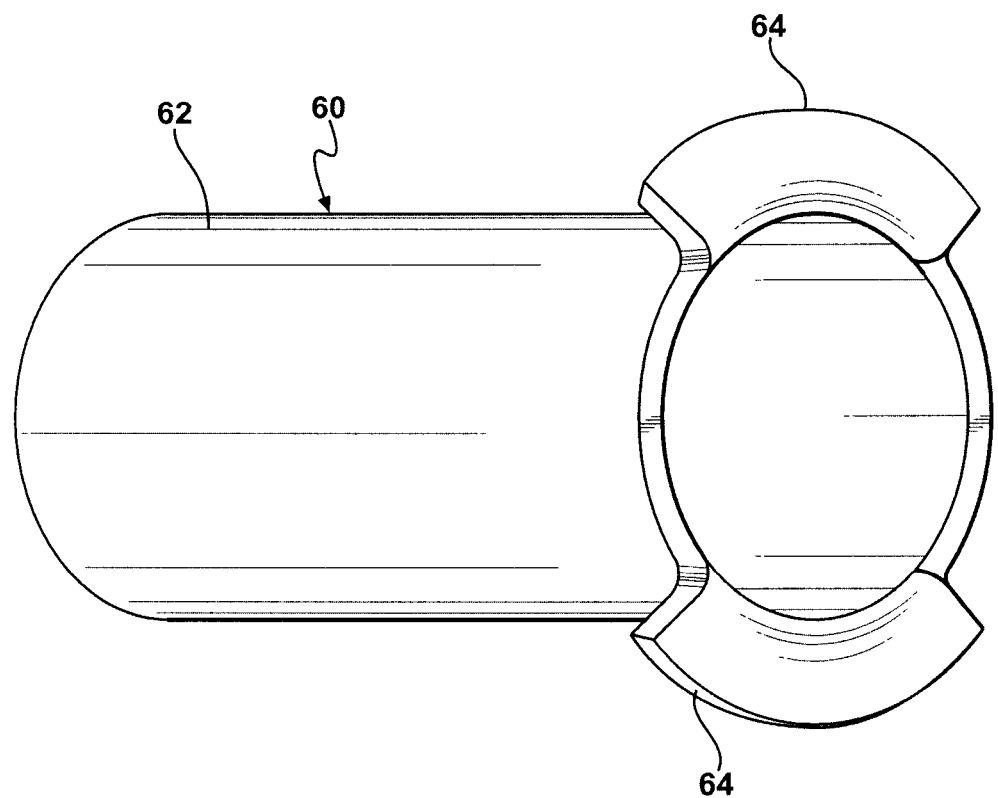
FIG. 4 is perspective view of a shaft removal tool that can be used in connection with the seal assembly of FIGS. 1-3.

FIG. 4 illustrates a seal removal tool 60 that can be employed in conjunction with the integrated pull tabs 52 to remove the seal assembly 10 from the bore 20. The tool 60 has a cylindrical body 62 formed at its leading end with a plurality of radially outwardly projecting ears 64. The cylindrical body 62 is sized to be extendible through the opening in the inner case defined by the inner margin of the pull tabs 52. The ears 64 are of a size and shape to be insertable through the recesses or openings 56 between the pull tabs. Once the ears are extended through the recesses 56, the tool 60 is turned (e.g., 90 degrees) to position the ears in the open space behind the pull tabs 52. A pulling force can then be applied to the tool 60 to urge the ears 64 against the inner pull surfaces 58 of the pull tabs 52 to draw the inner case 16 and thus the seal assembly 10 axially out of the bore 20. The combined views reveal that when the pulling force is applied to the tabs 52 the force will be transmitted through the inner case 16 to the outer case 12; specifically, through the cylindrical portion 40 abutting the outer end 46. This cooperative action results in the entire assembly 10 will be removed by the application of the pulling force on the tabs 52. Also, the application of the pulling force will be concurrently directed to both cases 12, 16 and will thus not affect the compressive load acting on the sealing element 18.

Figure 5:
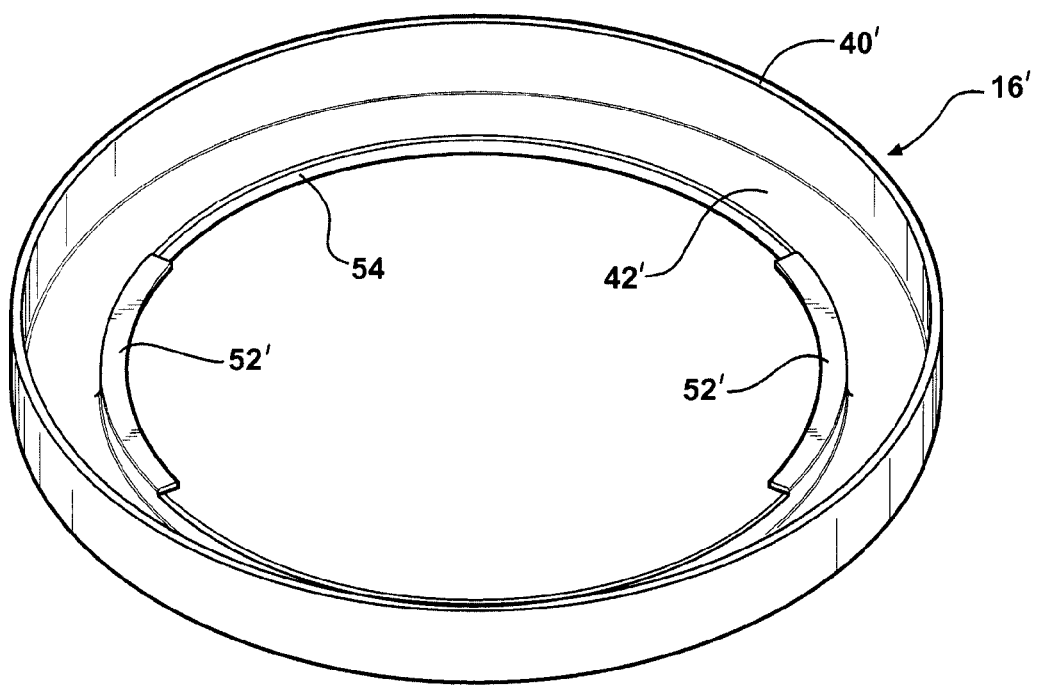
FIG. 5 is a perspective view of an inner casing according to an alternative embodiment.
Figure 6:
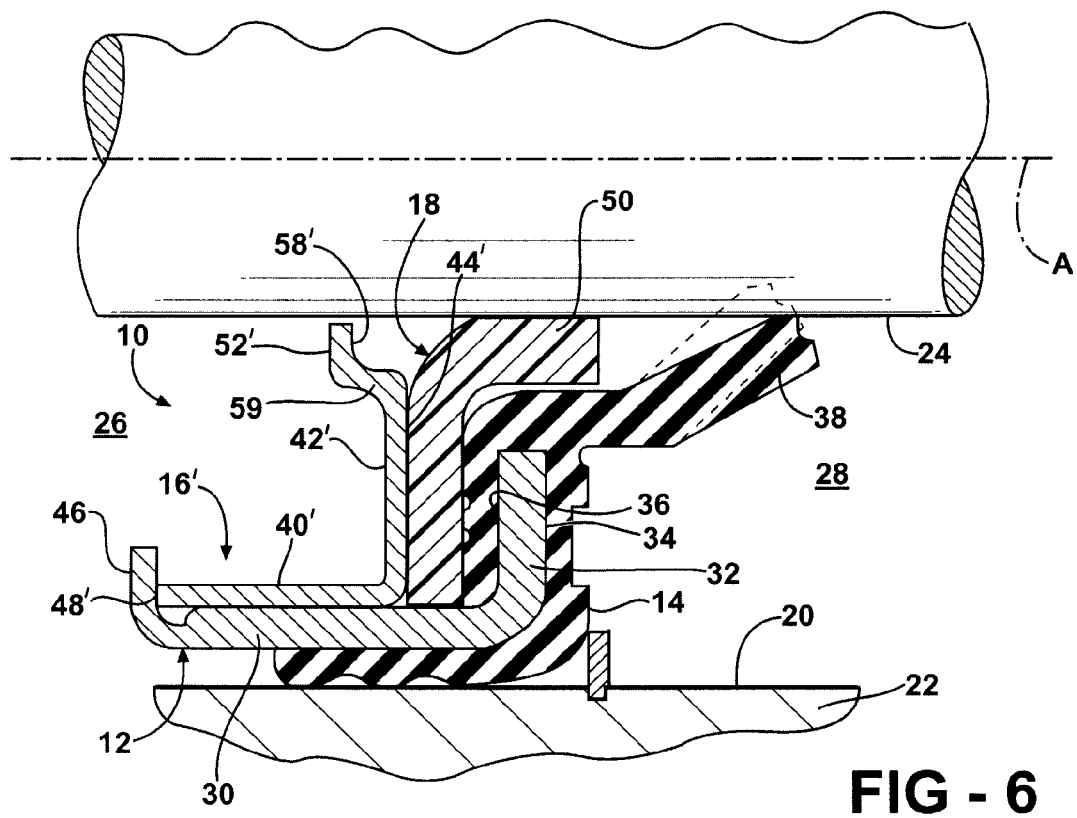
FIG. 6 is a view like FIG. 1, but incorporating the inner casing of FIG. 5.

FIGS. 5 and 6 illustrate an alternative embodiment where an inner case 16' is shown having the same general L-shaped configuration, including cylindrical portion 40' and flange portion 42' with clamping surface 44' as that of the first embodiment, and with primed numbers being used to represent like or similar features as those of the first embodiment of the inner case 16. The inner case 16' also includes a plurality of pull tabs 52' extending from the mouth edge 54'. However, in this second embodiment, the pull tabs 52' are stepped such that the inner pull surface 58' is generally parallel to the clamping surface 44', or perpendicular to the surface of the shaft or the cylindrical portion 40 of the inner case or generally perpendicular to a longitudinal axis A of the inner case 16'. This stepped configuration includes an offset shoulder region 59 formed as one piece with the inner case 16' and serving as a transition between the pull tabs 52' and the flange portion 42'. The stepped clamping surface 44' enables full, flush contact with the ears 64 of the removal tool 60. This enhances the contact surface area and may increase the load capacity of the pull tabs 52' and minimize any bending or pull out of the tool 60 past the tabs 52'.

Obviously, many modifications and variations of the present invention are possible in light of the above teachings. It is, therefore, to be understood that within the scope of the appended claims, the invention may be practiced otherwise than as specifically described.

What is claimed is:

1. A dynamic seal assembly, comprising:
   an outer annular case having a cylindrical mounting portion extending between a flange portion and an axially outer end;
   an inner annular case having a cylindrical outer leg with an annular inner leg extending radially inwardly from said cylindrical outer leg to a free inner mouth edge;
   an annular seal element clamped between said inner and outer cases with said axially outer end of said outer case being forceably curled over said cylindrical outer leg of said inner case to urge said inner and outer cases axially toward one another and thereby exert a clamping force on said seal element; and
   including at least one integral pull tab formed as one piece with said inner case, said at least one pull tab extending radially inwardly from said free inner mouth edge of said annular inner leg for engagement by a seal removal tool.

2. The assembly of claim 1 wherein said inner case includes a plurality of said pull tabs spaced circumferentially from one.

3. The assembly of claim 2 wherein said pull tabs project axially away from said seal element.

4. The assembly of claim 2 wherein there are two of said pull tabs.

5. The assembly of claim 2 wherein said inner case has a generally L-shaped axial cross-section.

6. The assembly of claim 1 wherein a space is provided behind said at least one pull tab and said seal element for receiving the tool.

7. The assembly of claim 1 wherein said at least one pull tab projects axially away from said mouth edge.

8. The assembly of claim 1 wherein said inner leg has an inner clamping face engaging said seal element.

9. The assembly of claim 8 wherein said at least one pull tab projects away from said inner clamping face at an acute angle.

10. The assembly of claim 9 wherein said angle is about 30 degrees.

11. The assembly of claim 8 wherein said inner clamping face is generally perpendicular to a longitudinal axis of the inner case.

12. The assembly of claim 1 wherein said at least one pull tab are exposed to an air side of said seal assembly.

13. The assembly of claim 12 wherein said at least one pull tab have axially inner pull surfaces.

14. The assembly of claim 1 wherein said curled over outer end of said outer case supports said inner case against axial separation in response to application of an axially outer seal-removing pull force applied to said at least one pull tab.

15. The assembly of claim 1 wherein said inner case is a one-piece stamped metal member.

* * * * *